US007533419B2

(12) United States Patent
Paya et al.

(10) Patent No.: US 7,533,419 B2
(45) Date of Patent: May 12, 2009

(54) HUMAN INTERACTIVE PROOF SERVICE

(75) Inventors: Ismail Cem Paya, Seattle, WA (US);
Josh D. Benaloh, Redmond, WA (US);
Raja P. Perumal, Kirkland, WA (US);
Trevin M Chow, Redmond, WA (US);
Erren Dusan Lester, Renton, WA (US);
Jeffrey Steinbok, Redmond, WA (US);
Julien D. Couvreur, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 799 days.

(21) Appl. No.: 10/977,185

(22) Filed: Oct. 29, 2004

(65) Prior Publication Data
US 2006/0095578 A1    May 4, 2006

(51) Int. Cl.
*H04L 9/00* (2006.01)
(52) U.S. Cl. ........................................ 726/26; 713/182
(58) Field of Classification Search ........................ None
See application file for complete search history.

(56) References Cited

U.S. PATENT DOCUMENTS 6,292,897 B1    9/2001  Gennaro et al.
7,139,916 B2 *  11/2006 Billingsley et al. .......... 713/182

OTHER PUBLICATIONS

Chew, et al.; "Baffle Text: A Human Interactive Proof", Proceedings of SPIE-IS&T Electronic Imaging, SPIE vol. 5010 (2003); pp. 305-316.
Simard, et al.; "Using Character Recognition and Segmentation to Tell Computer from Humans", Proceedings 7th Int'l Conference on Document Analysis and Recognition; vol. 1, pp. 418-423.

* cited by examiner

*Primary Examiner*—Brandon S Hoffman
(74) *Attorney, Agent, or Firm*—Lee & Hayes, PLLC

(57) ABSTRACT

A human interactive proof (HIP) service is described. In response to a request from a web server, the HIP service generates a HIP challenge and an associated attestation. The web server can then embed the generated HIP challenge in a requested web page. The attestation is used to determine whether or not a user response to the HIP challenge is correct.

29 Claims, 16 Drawing Sheets

HUMAN INTERACTIVE PROOF SERVICE

TECHNICAL FIELD

This invention relates to human interactive proofs, and more specifically to techniques for providing a human interactive proofs service.

BACKGROUND

Human interactive proofs (HIPs) are challenges that can be presented via software to a user to help insure that a human being, as opposed to an automated system, is interacting with the software. HIPs are being utilized by more and more web sites to prevent, for example, automated creation of multiple web-based email accounts. Such automatically created accounts are frequently used for spam attacks and other non-desirable activities.

One common example of an HIP is an image that includes text, which may be an actual word or phrase, or may be a nonsensical combination of letters, digits, and other characters. To solve the HIP challenge, a user types in the characters that are shown. Other types of challenges (e.g., audio and/or video challenges) may also be developed as HIPs, with the purpose being to determine, for example, whether a particular request received by a web site is being initiated by a human being.

While some entities (e.g., large corporations) may have the resources to research and develop HIP challenges that are difficult for an automated system to solve, many other entities (e.g., small web-based businesses) have the desire to utilize HIP technology, but may not have the resources to develop effective HIP challenges.

Accordingly, a need exists for a HIP service that can be accessed by multiple entities.

SUMMARY

A human interactive proof (HIP) service is described. The service generates a HIP challenge and associated attestation in response to receiving a request for a HIP challenge. The attestation can be transmitted to the system that requested the HIP challenge, thereby enabling the requesting system to evaluate a response to the HIP challenge. Alternatively, the HIP service may be configured to evaluate a response to a generated HIP challenge.

DETAILED DESCRIPTION

Overview

The embodiments described below enable generation of a human interactive proof (HIP) via a service. In the described implementations, a web server may utilize a HIP service to generate a HIP challenge that can then be embedded on a particular web page. The HIP service may be implemented, for example, as a web-based service, or as shrink-wrapped software that may be installed on the web server.

Figure 1:
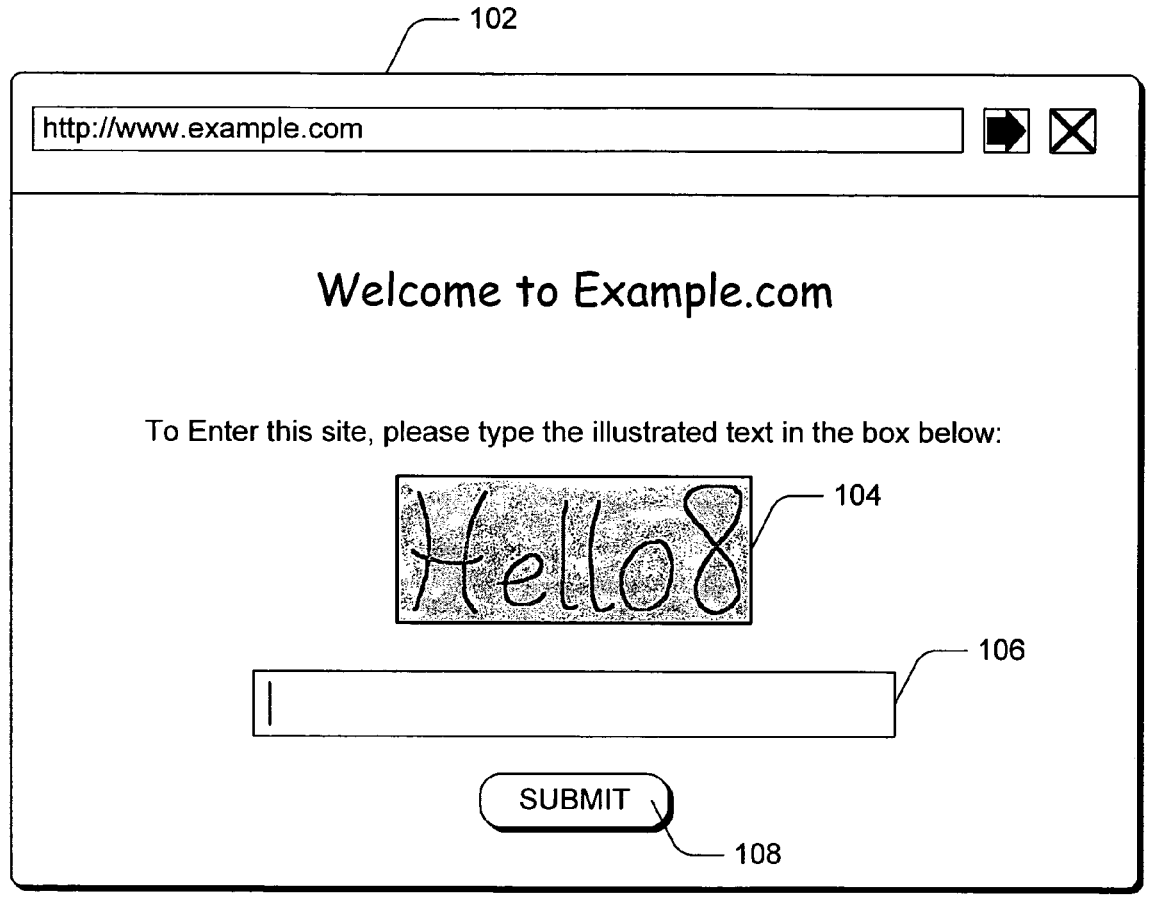
FIG. 1 is a pictorial diagram that illustrates a screen shot of an exemplary web page that includes a human interactive proof.

FIG. 1 illustrates an exemplary web page 102 that includes a HIP challenge 104. In the illustrated example, the HIP challenge 104 is an image that includes embedded text. A user is directed to solve the HIP challenge 104 by typing the text into a textbox 106. The user may then select the submit button 108, causing the user's answer to the HIP challenge to be transmitted to a server for evaluation. In the illustrated example, if the user's answer is correct, the user is granted access to the website. If the user's answer is incorrect, an error message may be displayed and, for example, another HIP challenge may be presented.

Exemplary Environments

Figure 2:
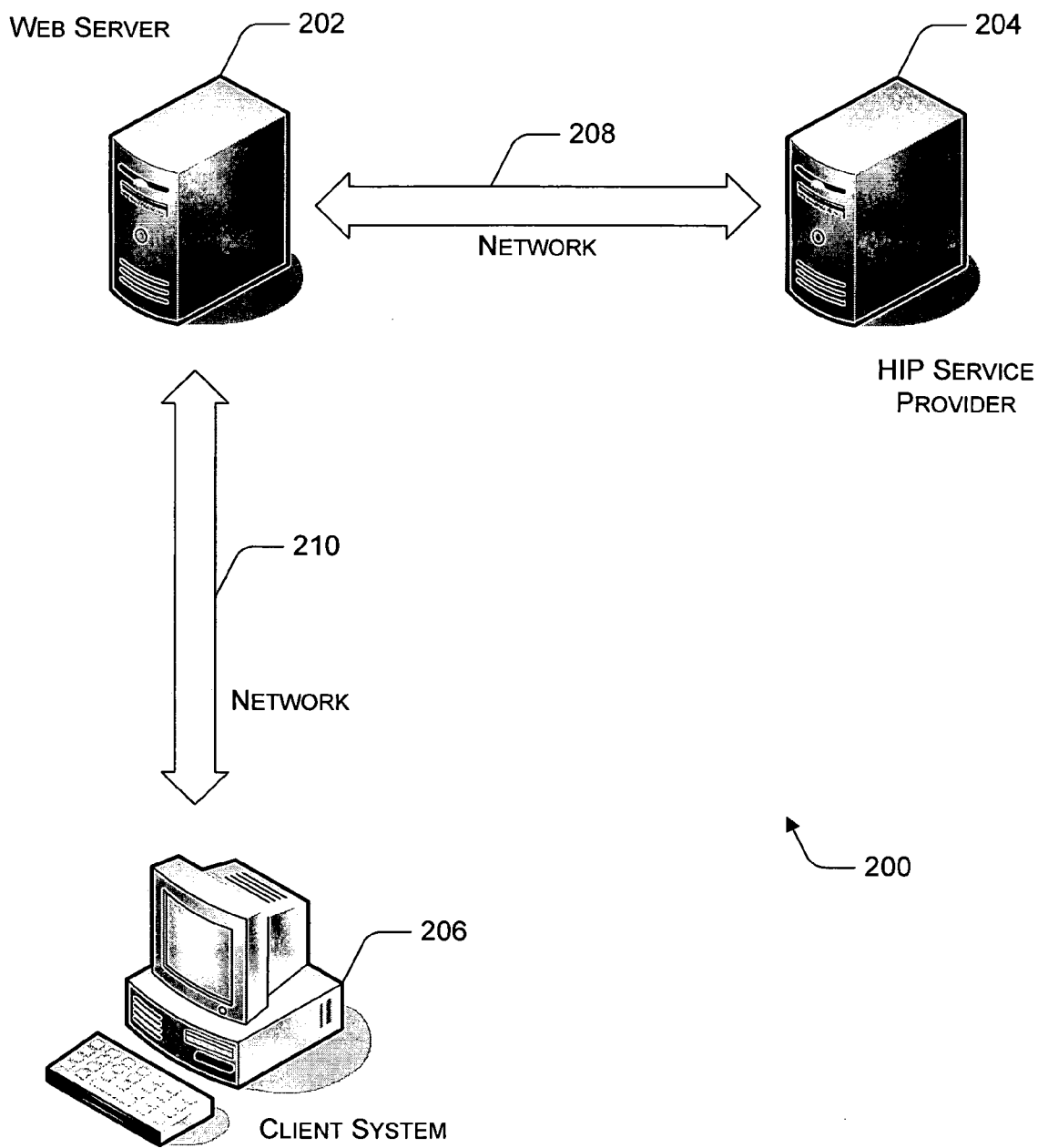
FIG. 2 is a pictorial diagram that illustrates an environment in which an exemplary human interactive proof service may be implemented.
Figure 3:
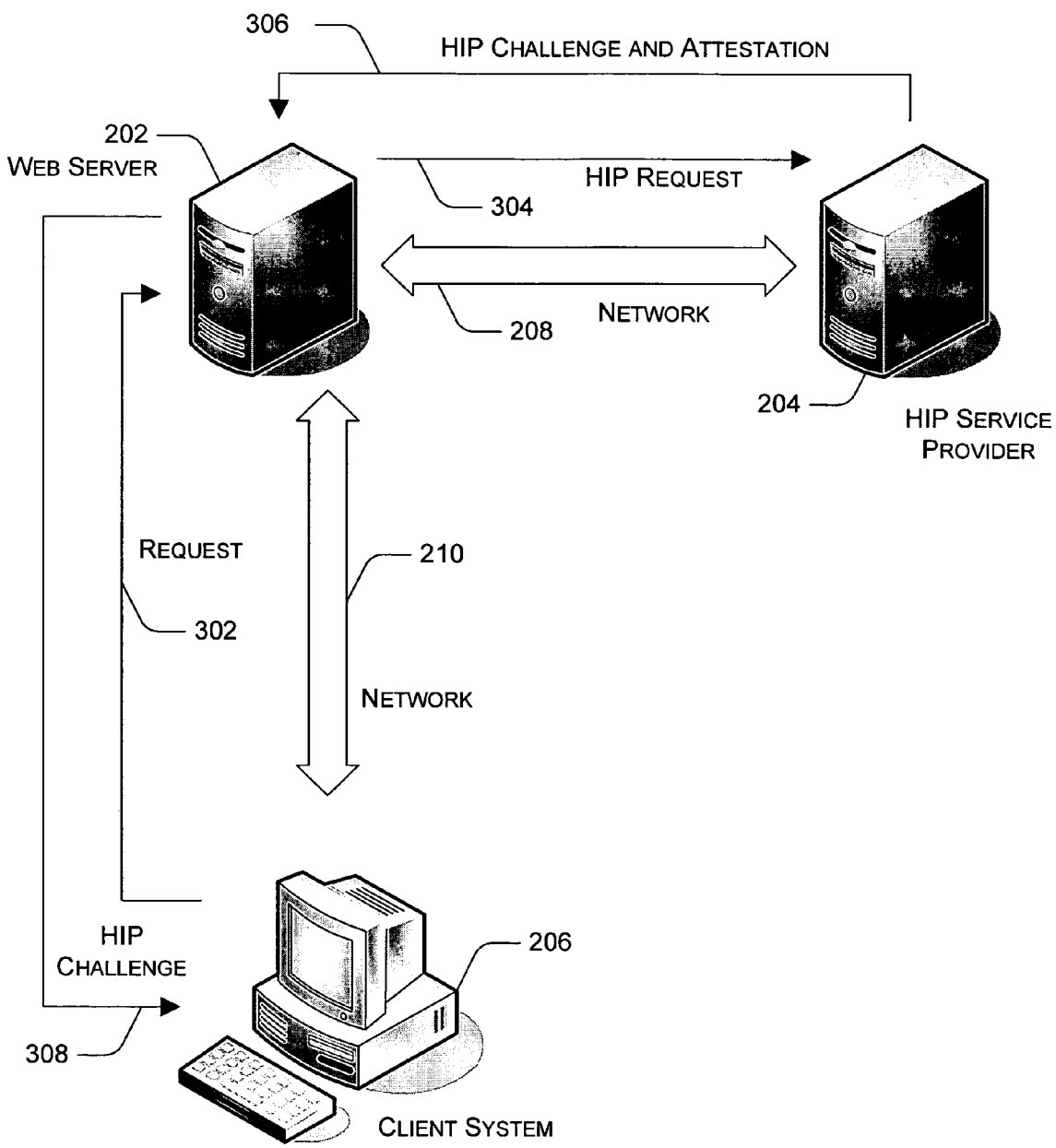
FIG. 3 is a pictorial diagram that illustrates an exemplary series of communications that may occur in obtaining a human interactive proof challenge from a human interactive proof service provider.
Figure 4:
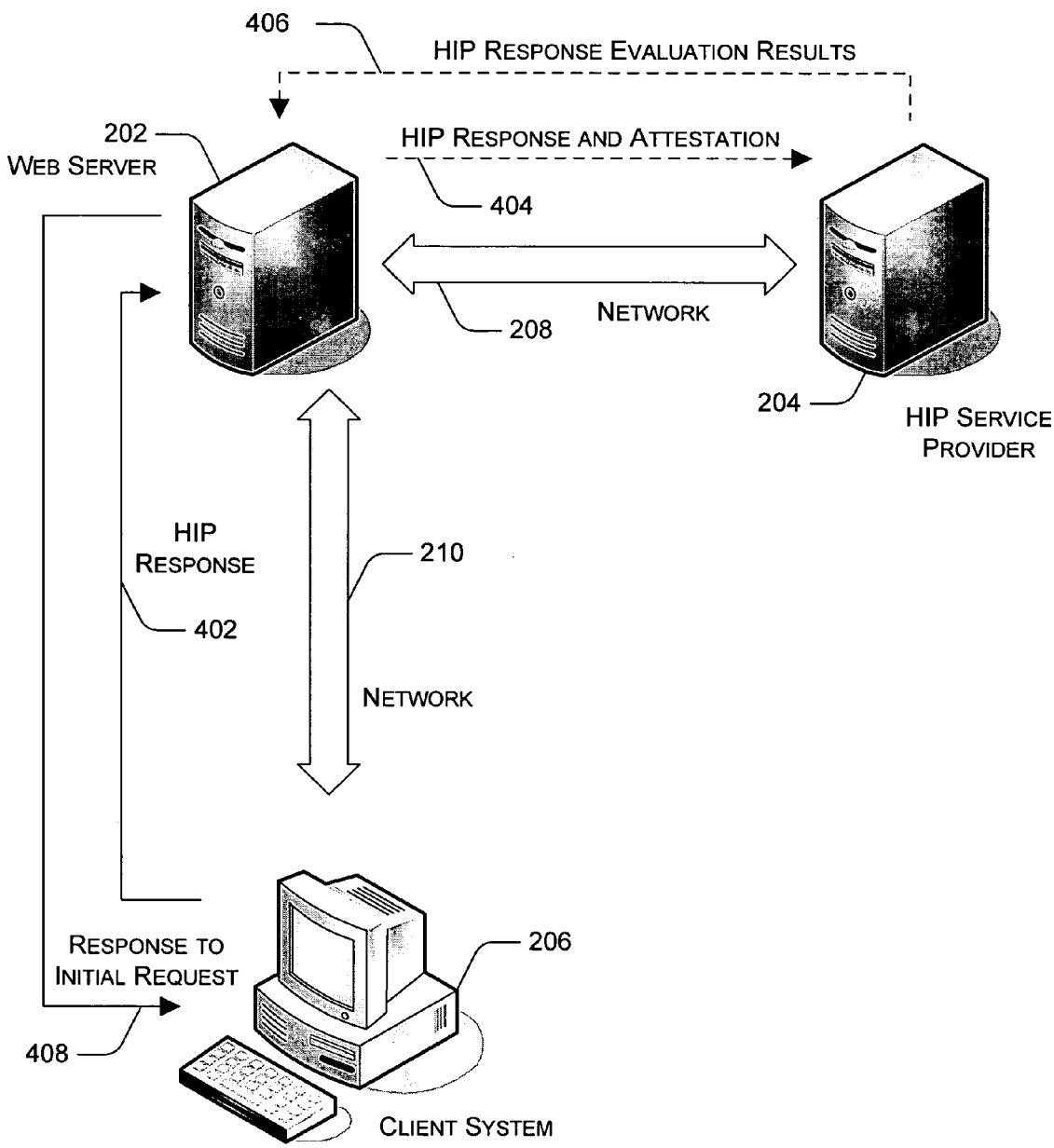
FIG. 4 is a pictorial diagram that illustrates an exemplary series of communications that may occur in evaluating a user response to a human interactive proof challenge.

FIGS. 2-4 illustrate an implementation of an exemplary HIP service. FIGS. 5-8 illustrate alternate implementations of an exemplary HIP service.

FIG. 2 illustrates an exemplary network environment 200 in which a HIP service may be implemented. The illustrated environment includes server 202, HIP service provider 204, and client system 206. Communications between server 202 and HIP service provider 204 are transmitted over network 208. Communications between server 202 and client system 206 are transmitted over network 210. Although only one client system is illustrated, it is recognized, and expected, that environment 200 may support multiple client systems. Furthermore, although only one server is illustrated, it is also recognized, and expected, that environment 200 may support multiple servers.

Server 202 is configured to respond to requests received from client system 206. For example, if implemented as a web server, server 202 may generate and serve web pages in response to requests from client system 206. Server 202 may also be configured to evaluate a HIP challenge response received from client system 206, and to perform particular tasks based on whether or not the received HIP challenge response is correct. For example, if the received response is correct, access may be granted to another web page. On the other hand, if the received response is not correct, then an error message may be generated and transmitted to client system 206.

HIP service provider 204 is configured to generate HIP challenges based on requests received from server 202. HIP service provider 204 may also be configured to evaluate a response to a previously generated HIP challenge.

Networks 208 and 210 are representative of any type of data network over which requests and/or HIP challenges may be transmitted. Furthermore, networks 208 and 210 may be the same network or may be different networks. For example, network 208 may be an Ethernet network while network 210 may represent the Internet.

FIG. 3 illustrates an exemplary exchange of communication between client system 206, server 202, and HIP service provider 204, as illustrated in FIG. 2.

In the illustrated exemplary implementation, client system 206 submits a request, indicated by arrow 302, to server 202. Request 302 may be any type of request, for example, a request for a web page, a request to access a database, a request to execute a software application, and so on.

In response to request 302, server 202 transmits a HIP request 304 to HIP service provider 204. HIP service provider 204 generates a HIP challenge and associated attestation based on the received HIP request 304.

HIP service provider 204 then returns the generated HIP challenge and associated attestation to server 202, as illustrated by arrow 306. In an exemplary implementation, the attestation may be encrypted before it is transmitted from HIP service provider 204 to server 202.

Server 202 then transmits the HIP challenge to client system 206, as indicated by arrow 308. For example, the HIP challenge may be transmitted to client system 206 in the form of a web page that includes the HIP challenge.

FIG. 4 illustrates an exemplary exchange of communication when a response to the HIP challenge is entered by a user. When the HIP challenge is received by client system 206 (as indicated by arrow 308 in FIG. 3), the HIP challenge is presented to the user. For example, if the HIP challenge is transmitted as part of a web page, then the web page is rendered on a display device associated with client system 206. A user may then enter a response to the HIP challenge. The user's response to the HIP challenge is then transmitted to server 202, as indicated by arrow 402.

Server 202 may then evaluate the received response to the HIP challenge. For example, server 202 may be configured to evaluate the response based on the attestation that was previously received with the HIP challenge (as indicated by arrow 306 in FIG. 3).

Alternately, as indicated by dashed arrows 404 and 406, server 202 may transmit the received HIP response and the previously received attestation to HIP service provider 204 for evaluation. HIP service provider 204 may then evaluate the HIP response, and return HIP response evaluation results 406 that indicate whether or not the response to the HIP challenge is correct.

After the user's response to the HIP challenge has been evaluated, server 202 responds to the initial request (indicated by arrow 302 in FIG. 3). For example, if the initial request 302 was a request for a particular web page and the user's response to the HIP challenge was correct, then server 202 transmits the requested web page to server 206. If the user's response to the HIP challenge is incorrect, server 202 may, for example, transmit an error message to client system 206.

Figure 5:
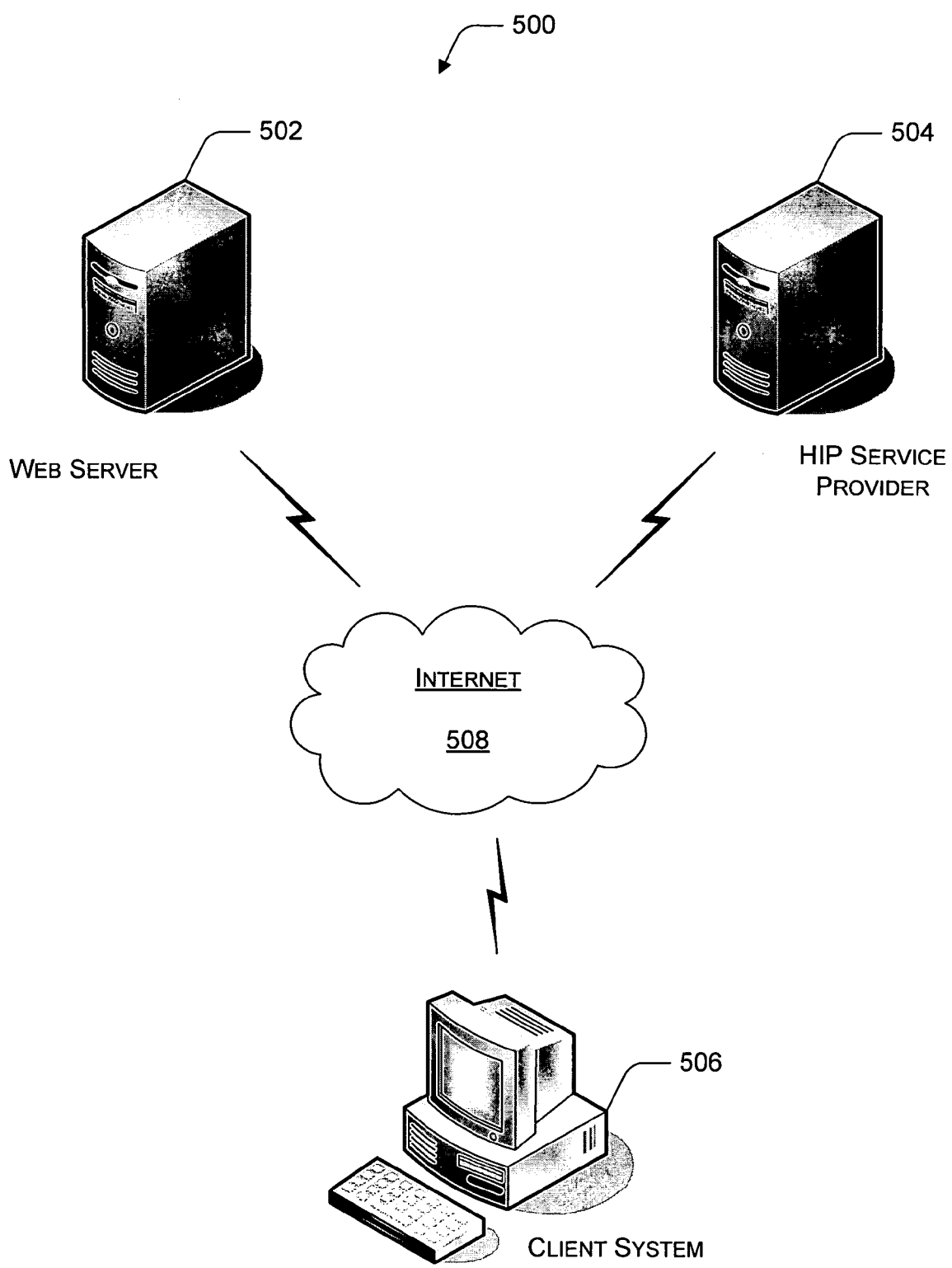
FIG. 5 is a pictorial diagram that illustrates an environment in which an exemplary web-based human interactive proof service may be implemented.

FIG. 5 illustrates an exemplary network environment 500 in which a web-based HIP service may be implemented. The illustrated environment includes web server 502, HIP service provider 504, and client system 506. Communications between web server 502, HIP service provider 504, and client system 506 are transmitted over a network such as the Internet 508. Although only one client system is illustrated, it is recognized, and expected, that environment 500 may support multiple client systems. Furthermore, although only one web server is illustrated, it is also recognized, and expected, that environment 500 may support multiple web servers.

Web server 502 is configured to generate and provide one or more web pages in response to requests received from client system 506. Web server 502 may also be configured to evaluate a HIP challenge response received from client system 506, and to perform particular tasks based on whether or not the received HIP challenge response is correct. For example, if the received response is correct, access may be granted to another web page. On the other hand, if the received response is not correct, then an error message may be generated and transmitted to client system 506.

HIP service provider 504 is configured to generate HIP challenges based on requests received on behalf of web server 502. A request for a HIP challenge may be received directly from web server 502 via the Internet 508, or a request for a HIP challenge may be received from web server 502 via client system 506 and Internet 508.

Figure 6:
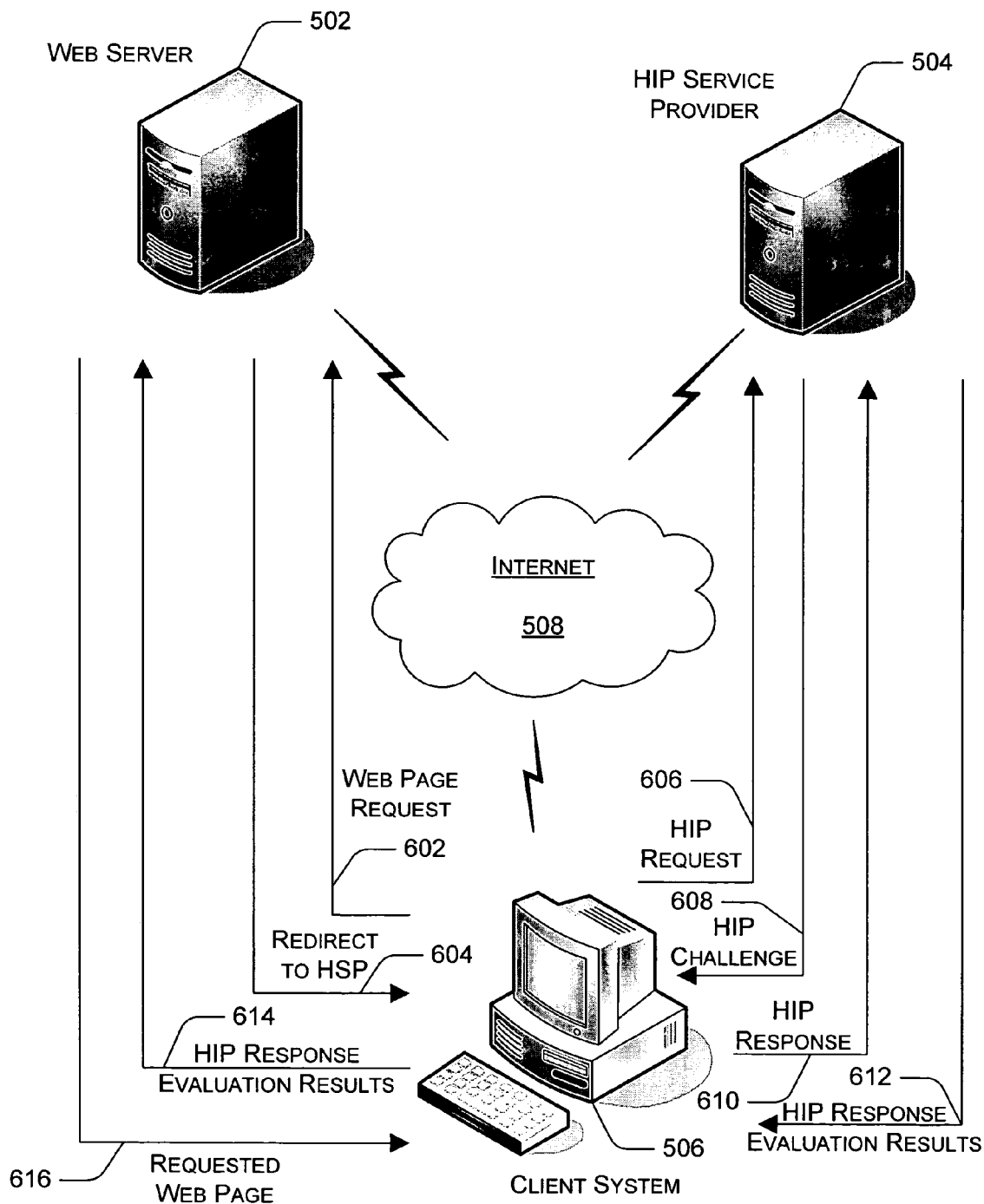
FIG. 6 is a pictorial diagram that illustrates an exemplary series of communications that may occur within the environment illustrated in FIG. 5.

FIG. 6 illustrates an exemplary exchange of communication between web server 502, HIP service provider 504, and client system 506 according to an exemplary implementation of environment 500 shown in FIG. 5.

Client system 506 requests a web page from web server 502, as represented by arrow 602. As indicated by arrow 604, in response to web page request 602, web server 502 returns a redirect to HIP service provider 504.

Based on redirect 604, client system 506 requests a HIP challenge (represented in FIG. 6 as arrow 606) from HIP service provider 504. HIP service provider 504 generates and returns a HIP challenge (represented in FIG. 6 as arrow 608). In an exemplary implementation, HIP service provider 504 may also return an attestation along with the HIP challenge. The attestation can then be packaged with a response to the HIP challenge so that the response can be easily evaluated.

As indicated by arrow 610, a user-submitted response to the HIP challenge is then transmitted back to HIP service provider 504. As described above, in an exemplary implementation, an attestation associated with the HIP challenge may be packaged with the response. HIP service provider 504 then evaluates the received response, and returns results of the evaluation to client system 506 (as indicated by arrow 612).

Client system 506 forwards the HIP response evaluation results to web server 502, as indicated by arrow 614. Web server 502 then determines, based on the received evaluation results, how to respond to the initial web page request (arrow 602). For example, if the evaluation results indicate that a user submitted a correct response to the HIP challenge, then, as indicated by arrow 616, web server 502 returns the web page that was initially requested. On the other hand, if the response to the HIP challenge was incorrect, web server 502 may return an error message to client system 506.

Figure 7:
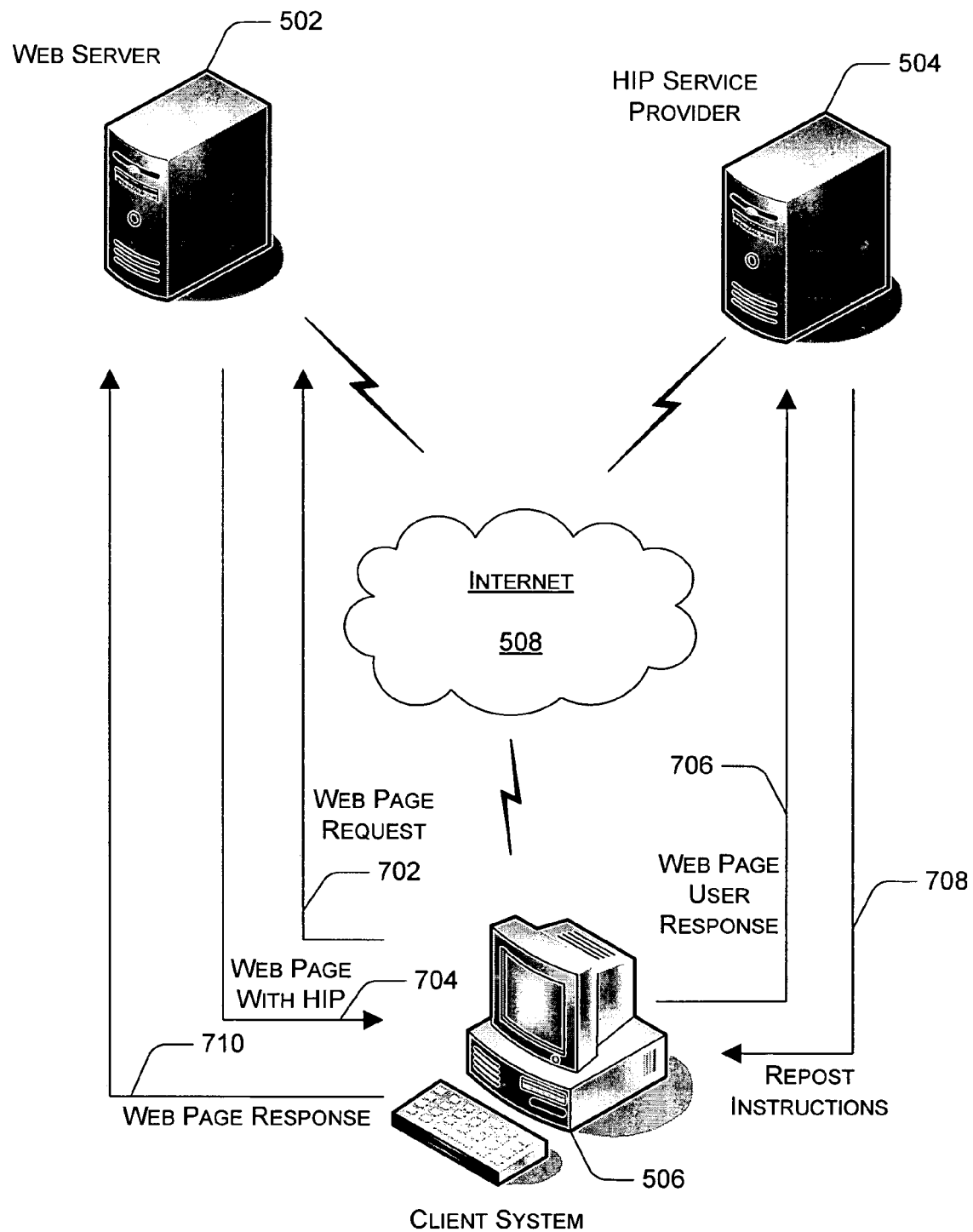
FIG. 7 is a pictorial diagram that illustrates an exemplary series of communications that may occur within the environment illustrated in FIG. 5.

FIG. 7 illustrates an exemplary exchange of communication between web server 502, HIP service provider 504, and client system 506 according to an alternate implementation of environment 500 shown in FIG. 5.

Client system 506 requests a web page from web server 502, as represented by arrow 702. As indicated by arrow 704, in response to web page request 702, web server 502 returns the requested web page, which includes a HIP challenge.

When the web page is rendered by client system 506, a user can then enter a response to the HIP challenge. As indicated by arrow 706, a user-submitted response to the HIP challenge is then transmitted to HIP service provider 504. In the described exemplary implementation, the user may have also entered other data through the web page (e.g., the web page included a form that the user filled out). In such an implementation, all of the data that was entered by the user, including the HIP challenge response, is posted to HIP service provider 504.

HIP service provider 504 evaluates the user response to the HIP challenge. If the response to the HIP challenge is correct, HIP service provider sends repost instructions 708 to client system 506, causing client system 506 to post the user's web page response (not including the HIP challenge response) to web server 502 (as indicated by arrow 710). If HIP service provider 504 determines that the user response to the HIP challenge is incorrect, then HIP service provider 504 may return instructions that cause client system 506 to send an error message to web server 502, indicating that the HIP challenge was not successfully solved.

Figure 8:
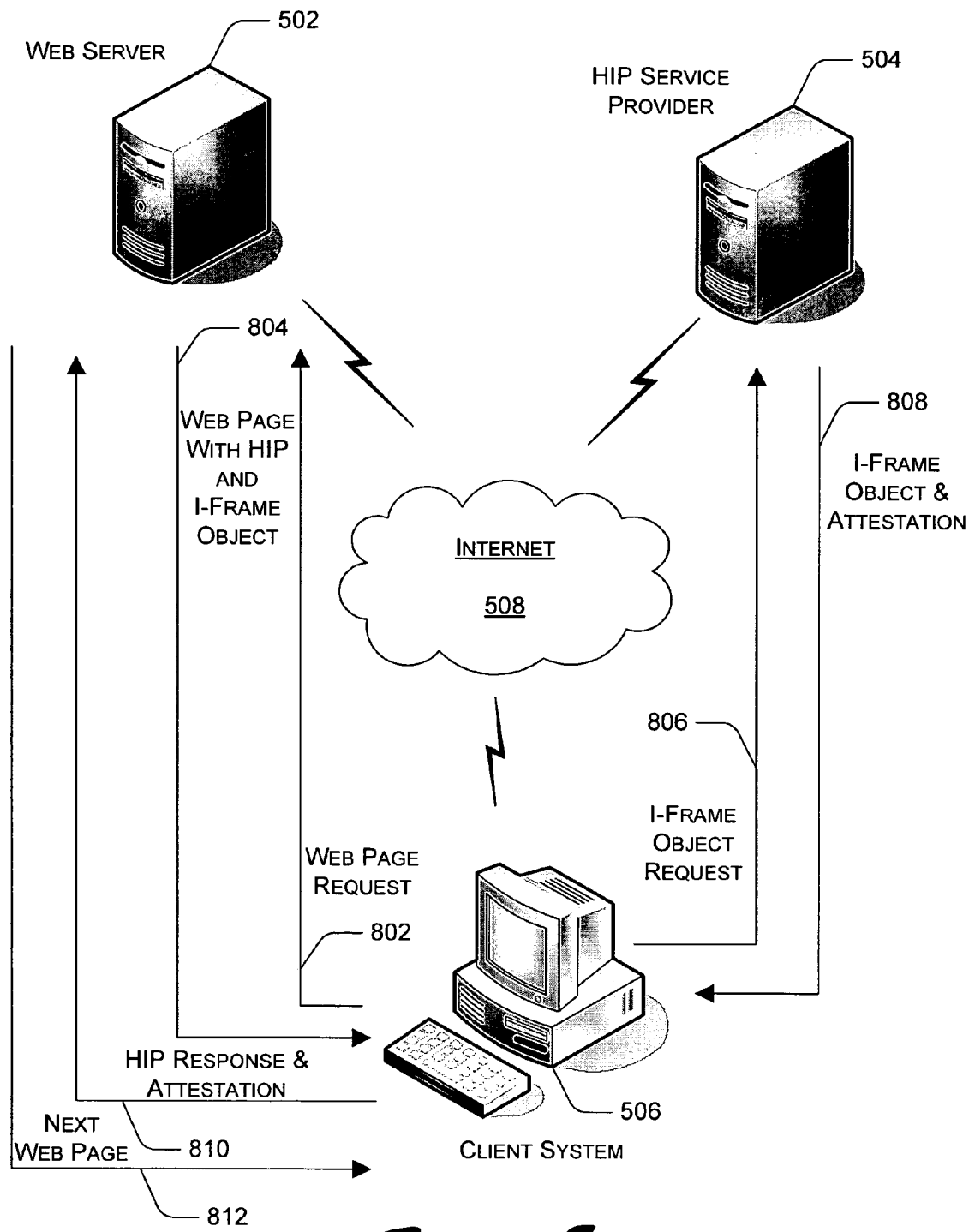
FIG. 8 is a pictorial diagram that illustrates an exemplary series of communications that may occur within the environment illustrated in FIG. 5.

FIG. 8 illustrates an exemplary exchange of communication between web server 502, HIP service provider 504, and client system 506 according to an alternate implementation of environment 500 shown in FIG. 5.

Client system 506 requests a web page from web server 502, as represented by arrow 802. As indicated by arrow 804, in response to web page request 702, web server 502 returns the requested web page, which includes a HIP challenge. The web page also includes an inline frame (I-frame) that includes an object (e.g., an image) that is hosted by HIP service provider 504. The object is formatted such that when the object is requested from HIP service provider 504, an attestation associated with the HIP challenge is also requested.

When client system 506 receives the web page, it generates a request for the I-frame object and transmits the request to HIP service provider 504 (as indicated by arrow 806). HIP service provider 504 returns the requested I-frame object and the attestation, as indicated by arrow 808. In an exemplary implementation, the attestation may be stored as a cookie on client system 506.

When the web page is rendered by client system 506, a user can then enter a response to the HIP challenge. As indicated by arrow 710, a user-submitted response to the HIP challenge is then transmitted along with the attestation to web server 502. In an exemplary implementation, the attestation may be stored as a cookie on client system 506. In such an implementation, the cookie can be transmitted to web server 502 with the user response to the HIP challenge.

Web server 502 then evaluates the user response to the HIP challenge using the received attestation. If the response to the HIP challenge is correct, web server 502 returns the next web page (as indicated by arrow 812), or performs whatever other processing is deemed appropriate. If web server 502 determines that the user response to the HIP challenge is incorrect, web server 502 performs other processing, for example, returns an error message to client system 506.

In any implementation of a HIP service, additional processing may be performed to further strengthen the use of HIP challenges. For example, to prevent an automated system from repeating attempts on a single HIP challenge, a time-to-live (TTL) can be associated with a HIP challenge when the challenge is generated. Each time a user attempts to solve such a HIP challenge, the TTL is examined to determine whether or not the challenge has expired.

Alternatively, a time-stamp could be associated with a request for a HIP challenge, and the same time-stamp could be required for a response to the HIP challenge. Such an implementation can be used to ensure that a user can submit only one response per HIP challenge.

To prevent an automated system from re-using a previously successfully answered HIP challenge, by storing context information associated with successfully answered HIP challenges. In an exemplary implementation, the context information is stored in a database and is used to invalidate any subsequent responses that match the context of an entry in the database. In the exemplary implementations described herein, such context data may be maintained by the HIP service provider and/or by the web server.

HIP Service Provider

Figure 9:
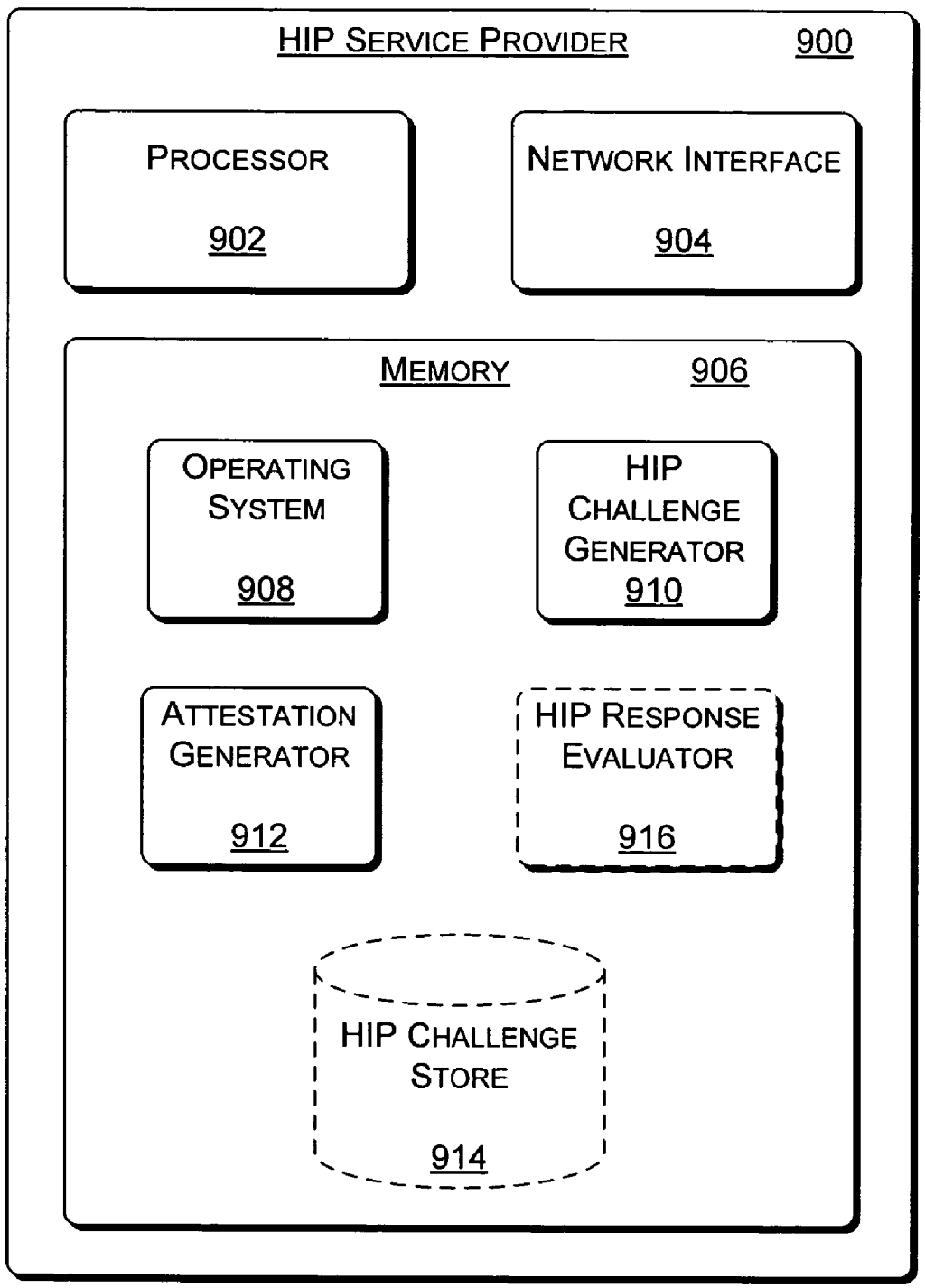
FIG. 9 is a block diagram that illustrates select components of an exemplary human interactive proof service provider.

FIG. 9 illustrates select components of an exemplary HIP service provider 900. HIP service provider 900 includes processor 902, network interface 904, and memory 906. Network interface 904 enables communication between HIP service provider 900 and other computer systems, such as web servers and/or client systems, via a network such as the Internet.

Operating system 908, HIP challenge generator 910, and attestation generator 912 are stored in memory 906 and executed on processor 902. HIP challenge generator 910 receives a request for a HIP challenge, and generates a HIP challenge based on the request. HIP challenges may be generated by any number of HIP challenge generation techniques. Furthermore, HIP challenge generator 910 may be configured to support generation of customized HIP challenges, for example, using a specific color scheme, as may be specified in a request for a HIP challenge. HIP challenges may also be customized in the sense that a request for a HIP challenge may specify a difficulty level that is to be associated with the requested HIP challenge. That is, depending on the reason for requesting a HIP challenge, a requestor may desire a fairly simple HIP challenge, or a more difficult to solve challenge. HIP challenge generator 910 may be configured to support generation of HIP challenges of various difficulty levels.

Attestation generator 912 generates an attestation associated with the HIP challenge that is created by the HIP challenge generator 910. Attestation generator 912 may also be configured to encrypt the attestation so that the attestation can be transmitted with the HIP challenge to a system from which a HIP challenge request was received. If the attestation is to be encrypted, any number of encryption techniques may be used to perform the encryption. An attestation may include any data that can enable a system to evaluate a response to a HIP challenge. For example, an attestation may consist of the answer to the HIP challenge. Alternatively, an attestation may consist of computer-readable instructions for evaluating a response to a particular HIP challenge.

HIP service provider 900 may also be configured to include HIP challenge store 914, which may be configured to store HIP challenges that are generated by HIP challenge generator 910. For example, when a HIP challenge request is received, a HIP challenge is generated, the HIP challenge may be stored in HIP challenge store 914, and an identifier associated with the HIP challenge may be returned in response to the request. The HIP challenge itself can then be retrieved via a request that includes the HIP challenge identifier.

Depending on the implementation, HIP service provider 900 may also include HIP response evaluator 916, stored in memory 904, and executed on processor 902. In such an implementation, HIP response evaluator 916 is configured to receive a user-entered response to a particular HIP challenge and then evaluate the user-entered response to determine whether or not the response is correct.

Web Server

Figure 10:
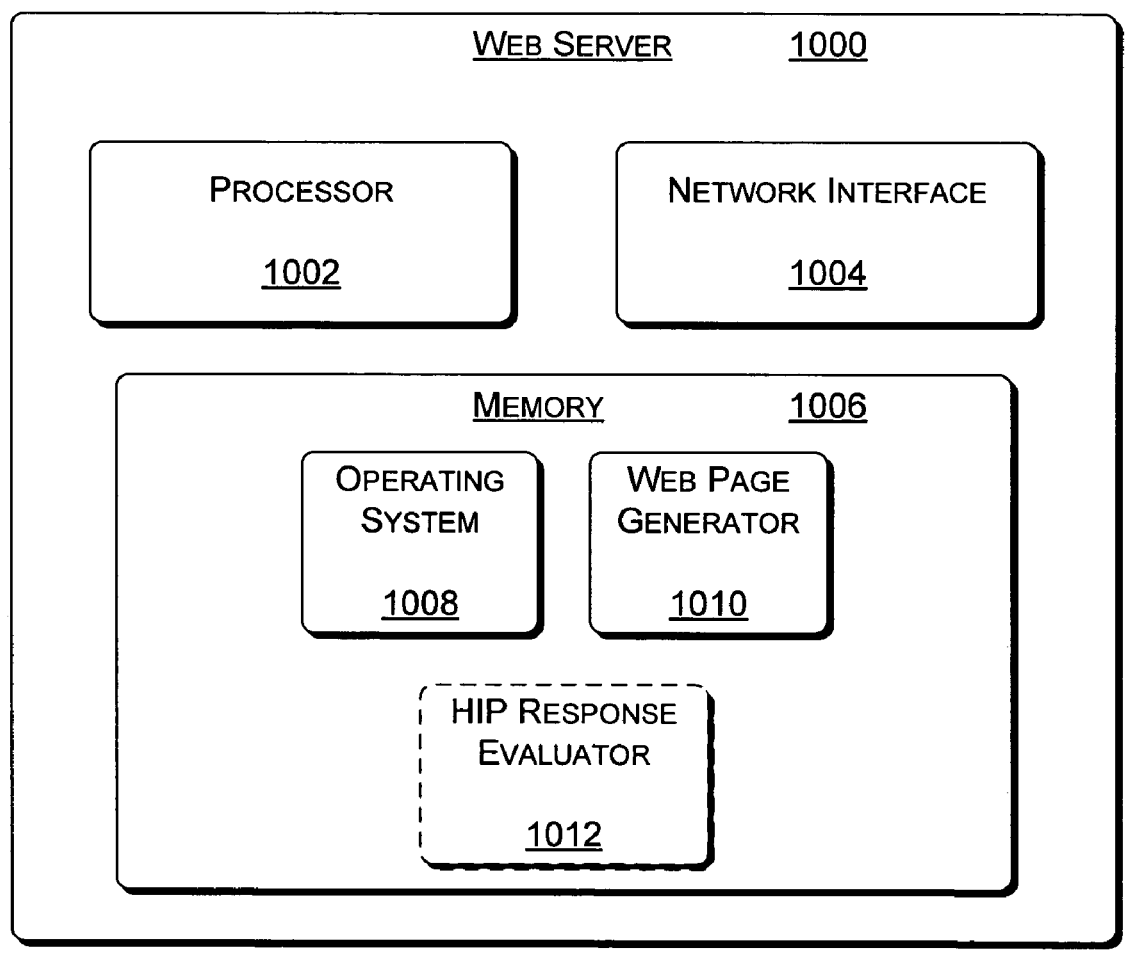
FIG. 10 is a block diagram that illustrates select components of an exemplary web server configured to utilize a human interactive proof service.

FIG. 10 illustrates select components of an exemplary web server 1000. Web sever 1000 includes processor 1002, network interface 1004, and memory 1006. Network interface 1004 enables communication between web server 1000 and other computer systems, such as client systems and/or HIP service providers, via a network such as the Internet.

Operating system 1008 and web page generator 1010 are stored in memory 1006 and executed on processor 1002. Web page generator 1010 receives a request for a web page, and generates a web page based on the request. If the web page is to include a HIP challenge, the web page generator also generates a request for a HIP challenge to be submitted to a HIP service provider. Web page generator 1010 then embeds the generated HIP challenge (or a link thereto) into the web page, which is returned to the system from which the web page request was received.

In an exemplary implementation, web server 1000 may also include HIP response evaluator 1012, which is stored in memory 1006 and executed on processor 1002. In such an implementation, HIP response evaluator 1012 may be configured to evaluate a user response to a HIP challenge. For example, HIP response evaluator 1012 may receive an attestation, which may be encrypted, from a HIP service provider. When a user submits a response to a HIP challenge, HIP response evaluator 1012 can utilize the attestation to determine whether or not the user response is correct. In an alternate implementation, user response evaluation may be performed by the HIP service provider, rather than by the web server 502. For example, when web server 1000 receives a user response to a HIP challenge, the web server 1000 may forward the user response to a HIP service provider for evaluation. Such an implementation increases communication over the network, but may be desirable if memory or processing power is limited on web server 1000.

Figure 11:
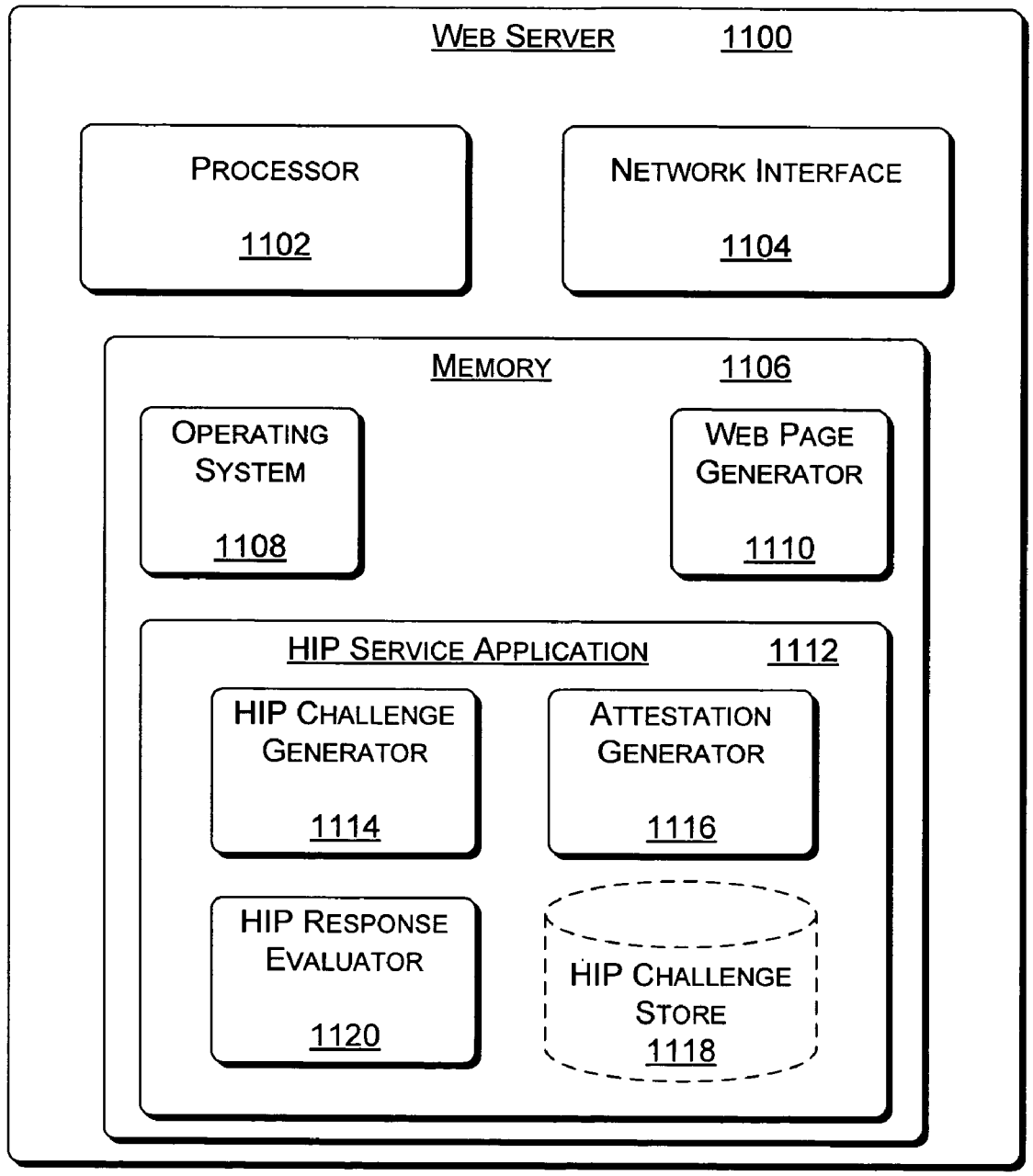
FIG. 11 is a block diagram that illustrates select components of an exemplary web server that includes a human interactive proof service application.

FIG. 11 illustrates select components of an exemplary web server that includes a human interactive proof service application. Web sever 1100 includes processor 1102, network interface 1104, and memory 1106. Network interface 1104 enables communication between web server 1100 and other computer systems, such as client systems and/or HIP service providers, via a network such as the Internet.

Operating system 1108, web page generator 1110, and HIP service application 1112 are stored in memory 1106 and executed on processor 1102. Web page generator 1110 receives a request for a web page, and generates a web page based on the request. If the web page is to include a HIP challenge, web page generator 1110 also sends a request for generation of a HIP challenge to HIP service application 1112.

HIP service application 1112 includes HIP challenge generator 1114, attestation generator 1116, HIP challenge store 1118, and HIP response evaluator 1120. When HIP service application 1112 receives a request for generation of a HIP challenge, HIP challenge generator 1114 generates a HIP challenge and attestation generator 1116 generates an attestation associated with the HIP challenge. The HIP challenge and attestation may then be stored in HIP challenge store 1118, and the HIP challenge is returned to web page generator 1110.

Web page generator 1110 then generates the web page, including the generated HIP challenge, and returns the web page to the system from which the web page request was received.

HIP response evaluator 1120 is configured to evaluate a user response to the HIP challenge. For example, when web server 1100 receives a response to the HIP challenge, HIP response evaluator 1120 uses the previously generated attestation to evaluate the response.

Generating a HIP Challenge

Figure 12:
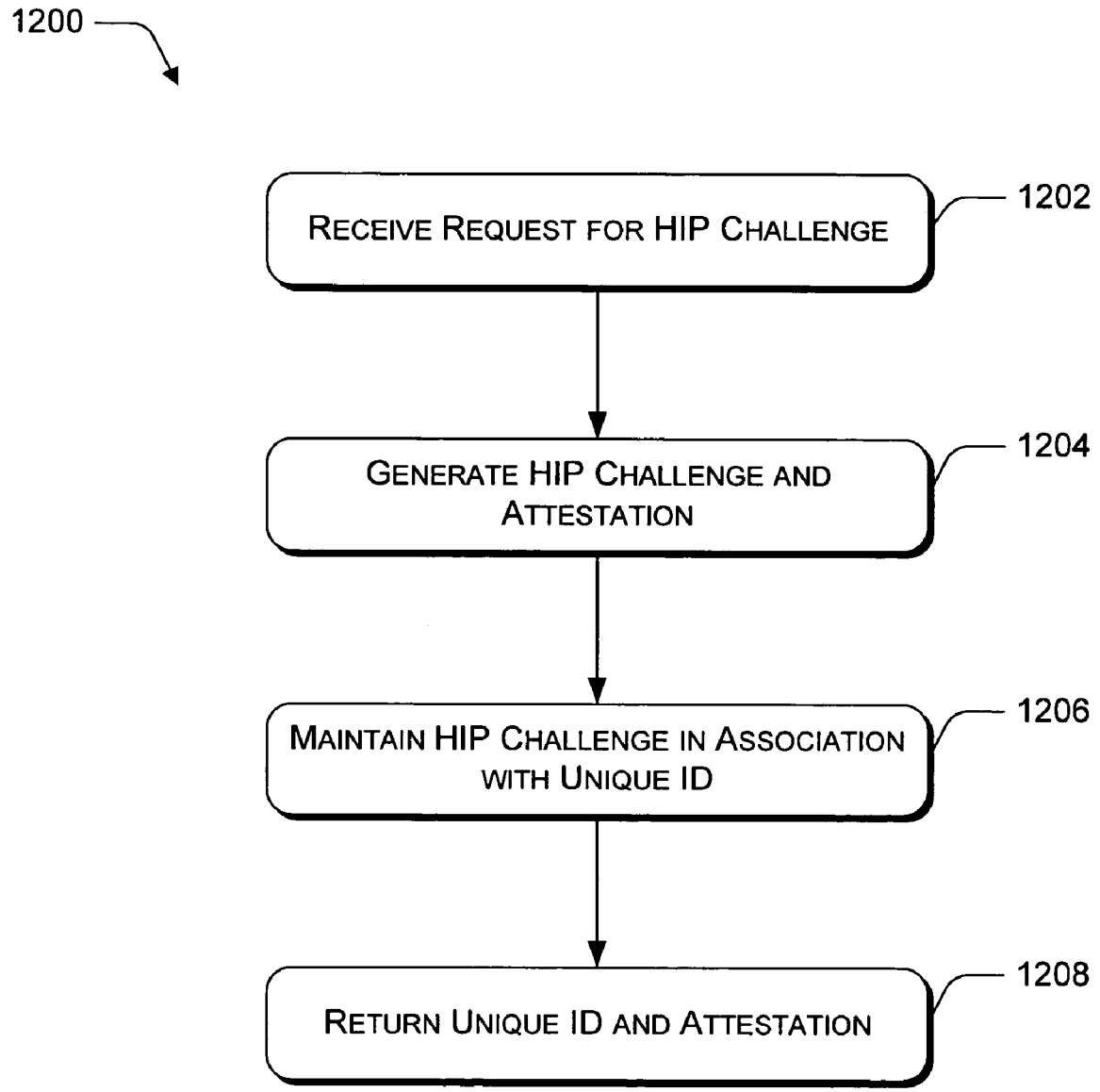
FIG. 12 is a flow diagram that illustrates an exemplary method for generating a human interactive proof challenge in response to a request.

FIG. 12 is a flow diagram that illustrates an exemplary method 1200 for generating a HIP challenge in response to a request. The illustrated process can be implemented in any suitable hardware, software, firmware, or combination thereof.

At block 1202, a HIP service provider receives a request for a HIP challenge. For example, referring to FIG. 14, HIP service provider 204 receives request 304 generated by server 202 for a HIP challenge. A request for a HIP challenge may include parameters to be used by the HIP service provider in generating the HIP challenge. Example parameters may include, but are not limited to, difficulty level, requesting entity ID, and context.

The difficulty level parameter may be used to specify a difficulty level for the requested HIP challenge. That is, the HIP service provider may be configured to generate HIP challenges of different difficulty levels (e.g., easy, moderate, difficult), based on which difficulty level is specified in the request for the HIP challenge. For example, a HIP challenge with an "easy" difficulty rating may be used to protect a less valuable resource, while a HIP challenge with a "difficult" difficulty rating may be used to protect a more valuable resource. The distinction being that the higher the difficulty rating, the less likely it is that an automated system will be able to solve the HIP challenge.

The requesting entity ID parameter may be used to indicate, for example, a company from which the request is being received. This information may then be used to generate a HIP challenge with a customized style (e.g., using a color scheme or a background that is associated with the identified company).

The context parameter may be used to uniquely identify the request. A unique identifier based, for example, on a date/time stamp can be associated with the request via the context parameter. The context may then be used to limit access to the HIP challenge that is generated in response to the received request.

At block 1204, the HIP service provider generates a HIP challenge and an associated attestation based on the request. Any number of methods may be used to generate the HIP challenge and attestation. Furthermore, the attestation, which includes data that can be used to evaluate a response to the HIP challenge, can take on any number of forms. In an exemplary implementation, the context (described above with reference to block 1202) may also be, in any number of ways, associated with the attestation. For example, the context may be encrypted with the attestation so that a context associated with a response can be compared to the context associated with the original request.

At block 1206, the HIP service provider maintains the generated HIP challenge, associated with a unique identifier.

For example, referring to FIG. 9, HIP service provider 504 stores the generated HIP challenge in HIP challenge store 914 with a unique identifier.

At block 1208, the HIP service provider returns the unique identifier and the attestation associated with the generated HIP challenge. In an exemplary implementation, the attestation is encrypted before it is returned.

Providing a HIP Challenge

Figure 13:
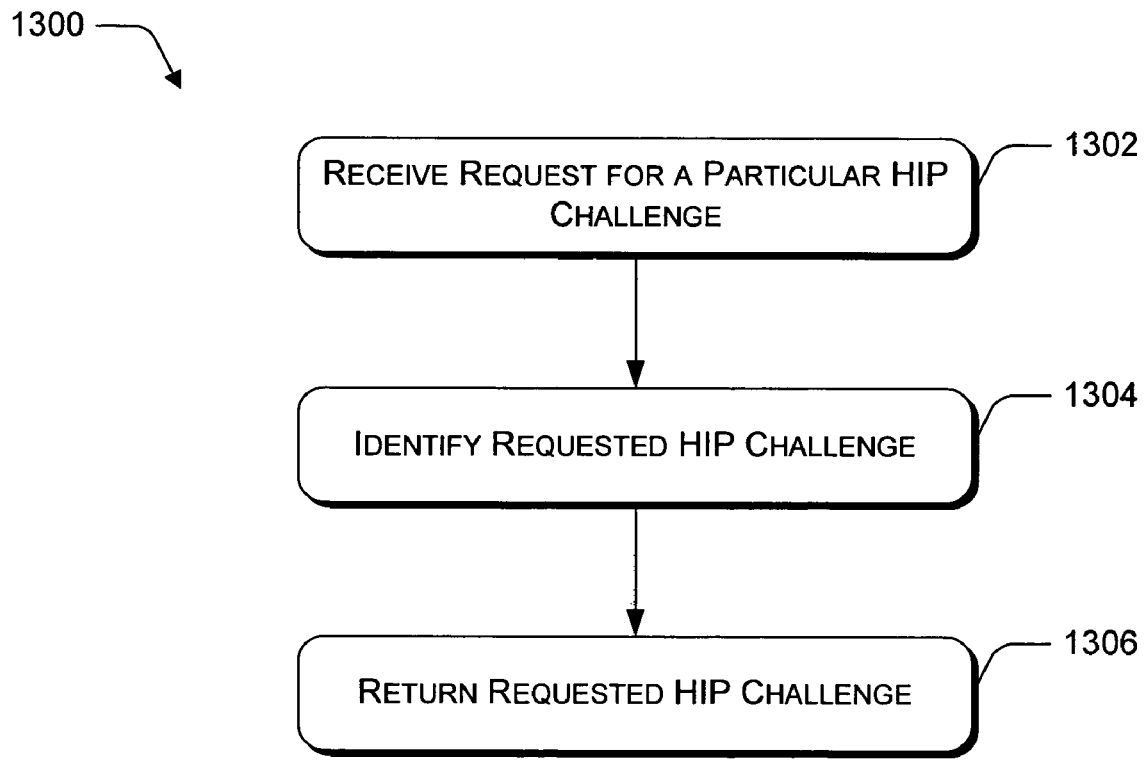
FIG. 13 is a flow diagram that illustrates an exemplary method for providing a particular human interactive proof challenge in response to a request.

FIG. 13 is a flow diagram that illustrates an exemplary method 1300 for providing a previously generated HIP challenge. The illustrated process can be implemented in any suitable hardware, software, firmware, or combination thereof.

At block 1302, a HIP service provider receives a request for a particular HIP challenge. For example, referring to FIG. 5, HIP service provider 504 receives a request generated by web server 502 for a particular HIP challenge identified by a unique identifier associated with the HIP challenge. In one implementation, the request may be received from web server 502. In an alternate implementation, the request may be received from client system 506, based on instructions contained in a web page generated by web server 502. In an exemplary implementation, to insure that a HIP challenge is not repeated, a request for a particular HIP challenge may also include a context associated with a previous request to generate the HIP challenge.

At block 1304, the HIP service provider identifies the HIP challenge based on the unique identifier included in the request. For example, HIP service provider 504 locates the HIP challenge in HIP challenge store 914, based on the unique identifier that is included in the request.

At block 1306, the HIP service provider returns the identified HIP challenge. For example, if the requested HIP challenge is in the form of an image, a file containing the image is returned.

Generating a Web Page that Includes a HIP Challenge

Figure 14:
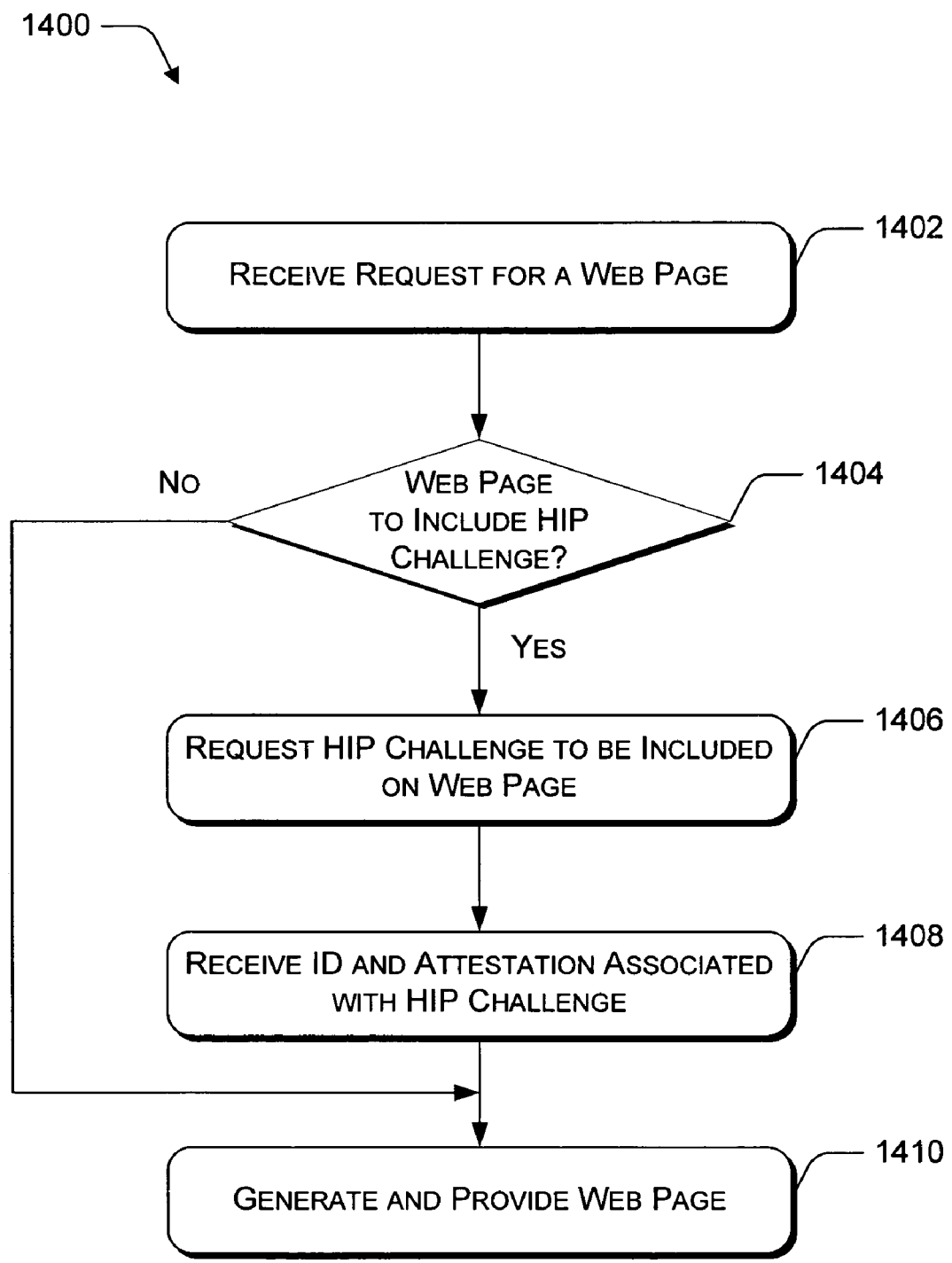
FIG. 14 is a flow diagram that illustrates an exemplary method for generating a web page that includes a human interactive proof challenge.

FIG. 14 is a flow diagram that illustrates an exemplary method 1400 for generating a web page that includes a HIP challenge. The illustrated process can be implemented in any suitable hardware, software, firmware, or combination thereof.

Figure 16:
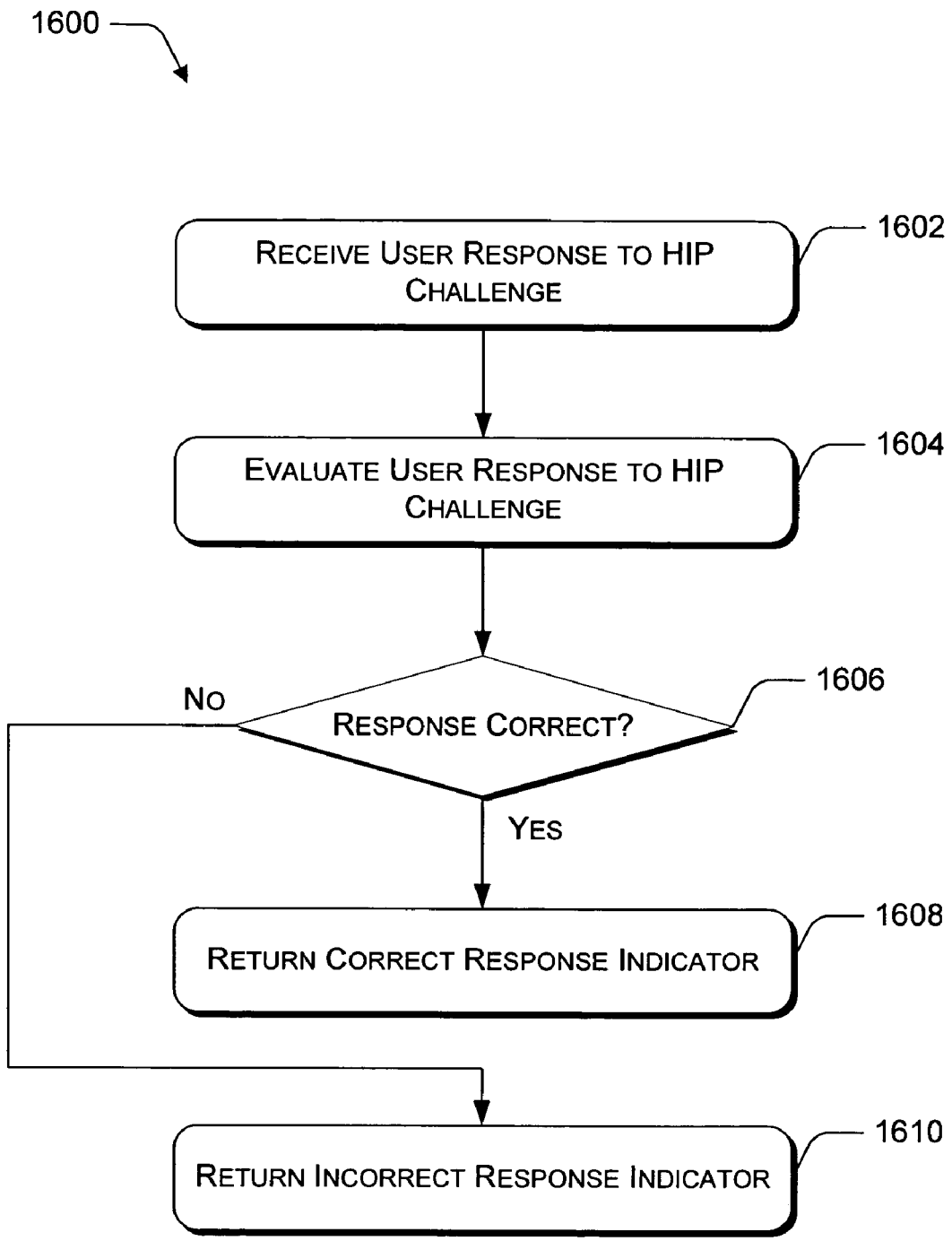
FIG. 16 is a flow diagram that illustrates an exemplary method for evaluating a user response to a human interactive proof challenge.

At block 1402, a web server receives a request for a web page. For example, as illustrated in FIG. 16, web server 502 receives web page request 1602. The request may be generated, for example, when a user enters a URL via a browser application.

At block 1404, the web server determines whether or not the requested web page is to include a HIP challenge. For example, in a web site that enables a user to sign up for a web-based email account, many pages of the web site may not include a HIP challenge, but the final page through which the user submits the actual request may include a HIP challenge. The web server may determine whether or not the requested page includes a HIP challenge based, for example, on elements or instructions associated with the page. Alternatively, the web server may determine whether or not the requested page is to include a HIP challenge based on events. For example, a challenge may be included only when there have been multiple failures to attempt to access a particular resource.

If it is determined that the requested web page does not include a HIP challenge (the "No" branch from block 1404), then processing continues at block 1410, where the requested web page is generated and transmitted to the requestor.

On the other hand, if it is determined that the requested web page is to include a HIP challenge (the "Yes" branch from block 1404), then at block 1406, the web server requests that a HIP challenge be generated. The request is transmitted to a HIP service provider. For example, referring to FIG. 14, a HIP request 304 may be transmitted from server 202 to HIP service provider 1304.

At block 1408, in response to the submitted request, the web server receives an identifier associated with a HIP challenge that has been generated in response to the request. In an exemplary implementation, the web server also receives an encrypted attestation associated with the HIP challenge. For example, referring to FIG. 14, a HIP challenge (or HIP challenge ID) and encrypted attestation are returned from HIP service provider 204 to web server 202 as indicated by arrow 1406.

At block 1410, the web server generates the requested web page to include the previously generated HIP challenge. For example, the web page may include a link (or other instruction) that directs the client system to retrieve the HIP challenge from the HIP service provider when rendering the web page. Alternatively, the web server may request and receive the HIP challenge while generating the web page such that the web page includes the HIP challenge when it is transmitted to the client system.

Evaluating a User Response to a HIP Challenge

Figure 15:
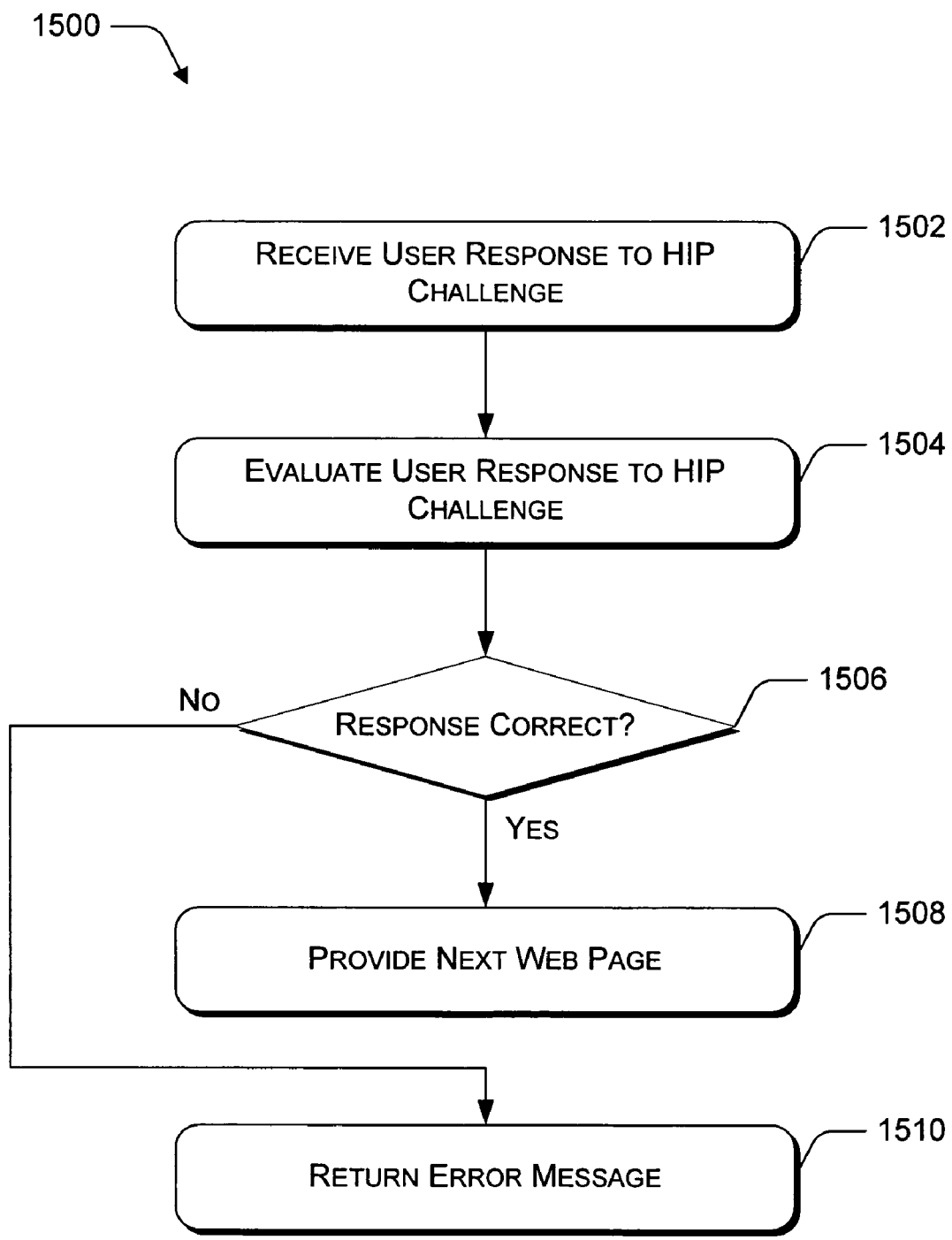
FIG. 15 is a flow diagram that illustrates an exemplary method for evaluating a user response to a human interactive proof challenge.

FIG. 15 is a flow diagram that illustrates an exemplary method 1500 for evaluating a user response to a HIP challenge as performed by a web server. The illustrated process can be implemented in any suitable hardware, software, firmware, or combination thereof.

At block 1502, the web server receives a user-submitted response to a HIP challenge. For example, as illustrated in FIG. 18, web server 502 receives HIP challenge response 810 from client system 506.

At block 1504, the web server evaluates the user response to the HIP challenge. For example, referring to FIG. 10, HIP response evaluator 1012 evaluates the received user response using a previously received attestation associated with the HIP challenge.

At block 1506, the web server determines whether or not the user response to the HIP challenge is correct. If the response is correct (the "Yes" branch from block 1506), then at block 1508, the web server provides the next web page (or performs whatever other processing was indicated by the web page that included the HIP challenge).

On the other hand, if it is determined that the user response to the HIP challenge is incorrect (the "No" branch from block 1506), then at block 1510, the web server responds with an error message.

In an alternate implementation, rather than evaluating the user response as described above, the web server receives the user response and then transmits the user response to the HIP service provider for evaluation. FIG. 16 is a flow diagram that illustrates an exemplary method 1600 for evaluating a user response to a HIP challenge as performed by a HIP service provider. The illustrated process can be implemented in any suitable hardware, software, firmware, or combination thereof.

At block 1602, the HIP service provider receives a user-submitted response to a HIP challenge. For example, referring to FIG. 15, after receiving response 1502, server 202 may transmit the response to HIP service provider 1304, as indicated by arrow 404.

At block 1604, the HIP service provider evaluates the user response to the HIP challenge. For example, referring to FIG. 9, HIP response evaluator 916 evaluates the received user response using an attestation associated with the HIP challenge. Depending on the implementation, the attestation may be stored by HIP service provider 504 or may be transmitted back to HIP service provider 504 with the user response.

At block 1606, the HIP service provider determines whether or not the user response to the HIP challenge is correct. If the response is correct (the "Yes" branch from block 1606), then at block 1608, the HIP service provider returns an indicator that the user response is correct.

On the other hand, if it is determined that the user response to the HIP challenge is incorrect (the "No" branch from block 1606), then at block 1610, the HIP service provider returns an indicator that the user response is incorrect.

The web server then performs the appropriate processing dependent upon whether the indicator received from the HIP service provider indicates that the user response is correct or incorrect.

CONCLUSION

The techniques described above enable implementation of a human interactive proof service that can be accessed by multiple entities. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A human interactive proof (HIP) service comprising:
    an interface for receiving HIP requests, wherein the interface receives the HIP requests from one or more web server systems on a network, the one or more web server systems submitting the requests in response to one or more client systems attempting to access information associated with the one or more web server systems;
    a HIP challenge generator for generating a HIP challenge in response to receiving a HIP request; and
    a HIP challenge store for maintaining the HIP challenge such that the HIP challenge can be requested by another system.

2. The HIP service as recited in claim 1, further comprising an attestation generator for generating an attestation associated with the HIP challenge.

3. The HIP service as recited in claim 1, wherein the HIP challenge store further maintains a representation of a previously generated HIP challenge to prevent repeated attempts to solve a particular HIP challenge.

4. The HIP service as recited in claim 1, wherein the HIP challenge store further maintains a representation of a previously solved HIP challenge to prevent subsequent access to a particular resource based on the previously solved HIP challenge.

5. The HIP service as recited in claim 1, further comprising a HIP response evaluator for evaluating a response to the HIP challenge.

6. The HIP service as recited in claim 1 implemented as a web-based service that is available to the one or more web server systems via a network connection.

7. The HIP service as recited in claim 1 implemented, in part, as a software application that can be installed and executed on a computer system.

8. A method comprising:
    receiving from a client system a request for a web page, the request being received by a web server hosting the web page;
    requesting, by the web server, that a human interactive proof (HIP) service generate a HIP challenge to be included on the web page, wherein the requesting includes:
        sending a requesting entity identification identifying a requesting entity associated with the web server;
        sending a customization parameter indicating a certain style relating to the HIP challenge; and
        indicating one of a plurality of difficulty levels, wherein each of the plurality of difficulty levels correspond to different values of resources associated with the requesting entity;
    generating the web page such that when the web page is rendered by the client system, the web page includes the HIP challenge that was generated by the HIP service, wherein the generating the web page comprises including an I-frame that is populated with a particular HIP challenge maintained by the HIP service when the web page is rendered, wherein the web page rendered by the client system is hosted by the web server and the I-frame that is populated with the particular HIP challenge is hosted by the HIP service;
    receiving from the client system a user response to the HIP challenge; and
    causing the user response to be evaluated, wherein the causing comprises:
        receiving an attestation associated with the HIP challenge;
        using the attestation to evaluate the user response;
        transmitting the user response to the HIP service; and
        receiving an indication of whether the user response is correct.

9. The method as recited in claim 8 wherein the HIP service is implemented as a remote web-based service.

10. The method as recited in claim 8 wherein the requesting comprises directing the client system to request that the HIP service generate the HIP challenge.

11. The method as recited in claim 8 wherein the generating comprises generating a web page that includes a link to a particular HIP challenge maintained by the HIP service such that when the client system renders the web page, the client system is directed by the link to request the particular HIP challenge from the HIP service.

12. A method comprising:
    receiving a first request to access information on a network, the first request being submitted by a client system and received by a server on the network;
    in response to receiving the first request, submitting a second request for a human interactive proof (HIP) challenge to be sent to the client system, wherein the second request is submitted by the server and is received by a HIP service on the network, the second request including a requesting entity identification indicating a customization to be associated with the HIP challenge for the requesting entity;
    generating, based on the requesting entity identification, a HIP challenge and an associated attestation based on the second request, wherein the HIP challenge includes the customization; and
    returning the HIP challenge to the client system.

13. The method as recited in claim 12 wherein:
    the second request indicates a difficulty level to be associated with the HIP challenge; and
    the generating comprises generating the HIP challenge that has the indicated difficulty level.

14. The method as recited in claim 12 wherein the customization comprises at least one of a visual customization or an audio customization.

15. The method as recited in claim 12 wherein the returning comprises:
   returning an identifier associated with the HIP challenge;
   receiving a subsequent request that specifies the identifier; and
   returning the HIP challenge in response to the subsequent request that specifies the identifier.

16. The method as recited in claim 12 further comprising encrypting the attestation.

17. The method as recited in claim 12 further comprising returning the attestation along with the HIP challenge.

18. The method as recited in claim 12 wherein the HIP challenge comprises at least one of an image, an audio object, or a video object.

19. A system comprising:
   means for processing comprising:
      means for generating a human interactive proof challenge in response to a request;
      means for generating an attestation associated with the human interactive proof challenge, the attestation comprising data that enables a system to evaluate a response to the human interactive proof challenge; and
   means for storing coupled to the means for processing, the means for storing comprising means for maintaining the human interactive proof challenge such that the human interactive proof challenge can be requested by another system, wherein the means for maintaining the human interactive proof challenge utilizes a unique identifier to identify the human interactive proof challenge when requested by another system.

20. The system as recited in claim 19 further comprising means for encrypting the attestation.

21. The system as recited in claim 19 further comprising means for transmitting the unique identifier associated with a human interactive proof challenge in response to a request.

22. The system as recited in claim 19 further comprising means for transmitting the human interactive proof challenge in response to a request.

23. The system as recited in claim 19 further comprising means for transmitting an attestation associated with a human interactive proof challenge in response to a request.

24. The system as recited in claim 19 further comprising means for evaluating a response to the human interactive proof challenge.

25. The system as recited in claim 19 implemented as a web-based service.

26. The system as recited in claim 19 implemented, in part, as a software application.

27. One or more computer-readable media having computer-readable instructions stored thereon, the computer readable instructions, when executed, configuring a computer system to perform acts comprising:
   receiving request to generate a human interactive proof (HIP) challenge, wherein the request includes:
      a requesting entity identification, identifying an entity on a network requesting the HIP challenge; and
      a customization parameter indicating a certain style associated with the requested HIP challenge;
   in response to the request, generating a HIP challenge and an associated attestation, wherein the HIP challenge and the associated attestation are sent to a client system interacting, via a network, with the entity on the network requesting the HIP challenge; and
   returning the the HIP challenge and the attestation.

28. The one or more computer-readable media as recited in claim 27 further having computer-readable instructions stored thereon, the computer-readable instructions, when executed, configuring a computer system to perform acts comprising:
   receiving receive a response to the HIP challenge;
   using the attestation to evaluate the response; and
   returning data that indicates whether the response is correct.

29. A web-based service comprising the one or more computer-readable media as recited in claim 27.

* * * * *